NOISE REDUCTION CIRCUIT FOR TELEVISION TRANSMITTERS
Filed Nov. 14, 1952
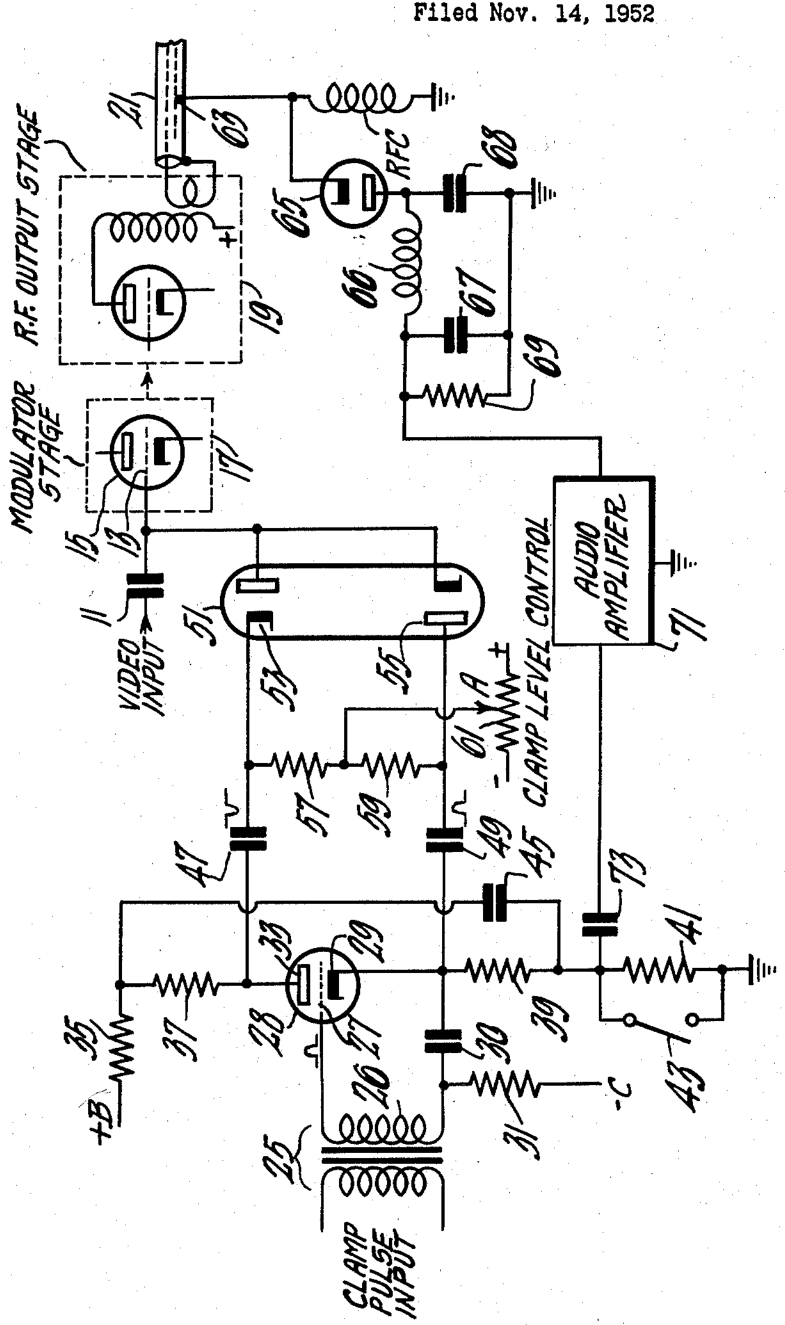
INVENTOR.
Raymond L. Meisenheimer
BY Charles H. Brown
ATTORNEY Patented July 15, 1958

2,843,661

NOISE REDUCTION CIRCUIT FOR TELEVISION TRANSMITTERS

Raymond Lamar Meisenheimer, Delaware Township, Camden County, N. J., assignor to Radio Corporation of America, a corporation of Delaware Application November 14, 1952, Serial No. 320,394

3 Claims. (Cl. 178—7.1)

This invention relates to apparatus and circuits for reducing noise components in a broad band signal, and particularly to such circuits utilizable in television transmitters.

Television transmitters usually contain circuitry to restore or establish the direct current and low frequency components in the composite video signal. This direct current component may be reinserted under the control of recurring pulses bearing a predetermined relationship to a fixed datum level of picture information, such as "picture black." The reinsertion may be accomplished by the use of a keyed clamp circuit which periodically and recurringly (under the control of the synchronizing pulses) clamps the control grid of a tube or a bank of tubes in a transmitter to a predetermined bias level.

In such a television transmitter, spurious modulation on the radio frequency output may appear and be transmitted as amplitude modulation of the maximum excursion of radio frequency carrier at synchronizing pulse peak level. This spurious modulation or noise may be caused by inadequate filtering of the various unidirectional or D. C. power supplies in the television transmitter, microphonics, alternating current operation of tube filaments, poor low frequency response, and voltage surges on the power line from which the transmitter is operated.

An object of the present invention is to reduce noise components in the output of television transmitters.

Another object of this invention is to provide a noise cancellation circuit for a television transmitter which effectively cancels spurious modulation but which does not operate on the picture information being transmitted.

A further object of this invention is to improve the operation of television transmitters employing direct current restoration and at the same time to reduce the cost of power supply filtering circuits used in such transmitters.

A further object of this invention is to provide a noise cancellation circuit for use in television transmitters which is operative to correct low frequency noise disturbances wherever they may arise in the transmitter and which supplements the correcting action of the clamp circuit.

In accordance with this invention, noise components in the output of a television transmitter are cancelled by a circuit arrangement which includes a peak detector coupled to the output of the transmitter, a feedback loop which may include an amplifier, and circuit connections to insert the correction signal into the clamp or direct current restoration circuit.

In the circuit arrangement of this invention, such undesired modulation is extracted by a radio frequency peak detector coupled to the output of the television transmitter. The signal thus detected is then reinserted, after amplification if necessary, through the clamp or direct current restoration circuit in the proper phase to cause cancellation of the undesired noise in the transmitter output. Since clamp circuit operation is at the frequency of the synchronizing pulses (15,750 cycles per second by present standards), all spurious modulation occurring at frequencies lower than the line repetition frequency is substantially eliminated. Further, since the correction signal is derived from the synchronizing pulse peak level rather than from the entire composite video signal output, and is reinserted in the clamp circuit, the noise reduction system does not interfere with or alter the picture information being transmitted.

A more detailed description of the invention follows in conjunction with the single figure of the drawing, which illustrates schematically the present invention.

Referring to the drawing, there is shown a portion of a television transmitter which includes a keyed clamp circuit shown in detail, modulator and radio frequency output stages indicated schematically, and the noise reduction circuit coupled between the radio frequency output stage and the keyed clamp circuit to effect correction of the undesired noise in the transmitter output in accordance with this invention. A composite video signal comprising the signals representative of the optical values of an image being televised and the blanking signals with the synhcronizing signals superimposed thereon is designated as the video input. This video input is impressed through a coupling capacitor 11 onto the control grid 13 of an electron discharge device or vacuum tube 15, in turn representative of the electron discharge device or devices in a modulator stage 17 in a television transmitter. The modulator stage 17 may directly modulate a radio frequency output stage 19 by any one of several high level modulation systems. Alternatively, in low level modulation systems, one or more linear radio frequency amplifier stages may be interposed between the modulated stage and the output stage 19. The radio frequency energy from the radio frequency output stage 19 is coupled into a radio frequency transmission line 21 which extends to suitable antenna coupling circuits and to a transmitting antenna.

Insertion or restoration of the direct current video component is accomplished by periodically and recurringly clamping the control grid 13 of the electron discharge device or devices in the modulator stage 17 to a predetermined bias voltage level. The clamping is accomplished by controlling the charge on the coupling capacitor 11 and the charge may be established while the composite video signal input is at the level of the peak of the synchronizing signals which are developed in conjunction with television apparatus. One such arrangement for "peak-of-sync" clamping is particularly disclosed and claimed in the co-pending application of Thomas M. Gluyas, Jr., Serial No. 300,480, filed July 23, 1952, now abandoned. Alternatively, clamping may be accomplished on the portion of the blanking signal following the synchronizing pulse peak, ordinarily termed the "back porch." Such an arrangement is found in Patent No. 2,539,774 to Thomas M. Gluyas, Jr., dated July 30, 1951. Clamping pulses in the proper time relation to the video input signal to establish the type of clamping desired, either "peak-of-sync" or "back porch" clamping, are developed in a pulse transformer 25. The secondary winding 26 of the pulse transformer 25 has one terminal thereof connected directly to the control grid 27 of a vacuum tube 28. The other terminal of the secondary winding 26 is returned to the cathode 29 of the vacuum tube 28 through a capacitor 30. The control grid 27, through the secondary winding 26 and a resistor 31, is also connected to the negative terminal —C of a bias voltage source. The vacuum tube 28 acts as a pulse amplifier and phase inverter and is energized from the positive terminal +B of a source of anode polarizing potential. This positive terminal +B is connected to the anode 33 through a dropping resistor 35 and an anode resistor 37. The cathode circuit of the pulse amplifier and phase inverter tube 28 contains a resistor 39, preferably of the same resistance as the anode resistor 37. An additional resistor 41 in the cathode circuit is paralleled by a switch 43 (shown open in the drawing) to complete the circuit to ground. A bypass capacitor 45 is connected across the entire series circuit consisting of the anode resistor 37, the anode-cathode path of the vacuum tube 28 and the cathode resistor 39. Instead of connecting the lower end of the grid resistor 31 to a bias voltage source —C, self bias may be employed by connecting the lower end of the resistor 31 to the junction of resistors 39 and 41.

Output signals are taken from both the anode 33 and the cathode 29 through the coupling capacitors 47, 49. Since the anode resistor 37 and the cathode resistor 39 are preferably equal, vacuum tube 28 acts as a phase inverter as well as a pulse amplifier from which push-pull (180° out-of-phase) pulses are abstracted. The pulse amplifier tube 28 applies these push-pull pulses to a dual or twin diode vacuum tube 51 through the capacitors 47, 49. The signal from the anode 33 is impressed onto the cathode 53 of one diode section of the dual diode 51. The signal from the cathode 29, which is developed across the cathode resistor 39, is impressed onto the anode 55 of the other diode section of tube 51.

Two resistors 57 and 59 are connected in series between the cathode 53 of one section and the anode 55 of the other section of the dual diode tube 51. These two resistors 57 and 59 are equal in value when the system is to be used with "back porch" clamping and with certain types of "peak-of-sync" clamping. The mid-point of these two resistors 57, 59 is maintained at a selected voltage level A, determined by the position of a tap on a potentiometric resistor 61, designated as a "clamp level control." The potentiometric resistor 61 forms a voltage divider between positive and negative terminals of a source of potential, indicated as "+" and "—" on the drawing.

The two halves of the dual diode 51 are keyed to conduction by the push-pull clamp pulses through the coupling capacitors 47, 49. The charge on the capacitor 11 is then brought to the potential existing across the two capacitors 47 and 49 to ground by charging or discharging through one or the other of the oppositely poled diode sections of the tube 51. The action is known as "clamping" the grid 13 of the modulator stage 17, since the grid 13 is brought to a precise voltage level upon the application of each clamp pulse.

The potential existing across the two capacitors 47 and 49 to ground is subject to the following considerations: the voltage level A determined by the position of the tap on the potentiometric resistor 61, and the voltage drop for the steady state current through the cathode circuit of the pulse amplifier tube 28.

In the present invention, an additional resistor or impedance 41 or other coupling means, such as a transformer, in the cathode circuit of the vacuum tube 28 acts to alter to some extent the net instantaneous charging voltage for capacitor 11. One way of considering the action of the additional impedance 41 in the cathode circuit is that it acts to elevate the entire phase inverter and pulse amplifier stage including the vacuum tube 28 above ground. The amount of voltage drop through the additional resistor 41 determines the degree to which this stage is elevated above ground. Instead of a resistor as shown, a transformer output winding may be connected in series between ground and the cathode resistor 39.

A portion of the radio frequency output is extracted from the output transmission line 21 by a probe or loop 63. The energy thus extracted is rectified in a nonlinear device such as a diode 65. An inductance 66 and capacitors 67, 68 form a low-pass filter. The radio frequency components of the output signal are bypassed to ground by the capacitor 68. The rectified signal is developed across a resistor 69 and represents the peak excursions of the radio frequency carrier at synchronizing pulse peak level. Stated in another way, the rectification and filtering of the output signal represent synchronizing pulse peak sampling. This sampling is done at the synchronizing pulse repetition frequency, that is, the line frequency (15,750 cycles per second by present standards).

The size of the capacitors 67 and 68 and the resistance 69 in the low-pass filter section will determine the upper frequency limit of signals developed across the resistor 69. The signals so developed will not include any frequencies above 15,750 cycles per second, and may, if desired, be limited to a few hundred cycles or up to five to six kilocycles per second. The signal across the resistor 69 may be fed to an audio amplifier 71 to bring it to the proper energy content and voltage level. Such an amplifier must have good low frequency response from a few cycles per second (say twenty to thirty cycles per second) up to and including seven or eight hundred cycles, and may extend to five or six kilocycles per second.

The signal amplified in the audio amplifier 71 contains the noise components such as those mentioned above appearing as incidental modulation on the synchronizing pulse peaks. This audio frequency signal is fed back into the clamp circuit through the coupling capacitor 73 in the proper phase and amplitude to substantially cancel this incidental modulation of the synchronizing pulse peaks. The audio frequency amplifier 71 should incorporate a gain control to regulate the amount of amplification so that the output signal is at the proper energy content and voltage level. The proper phase of the signal which is fed back will be obtained with a negative output detector, such as the diode 65 connected as shown, and a single stage resistance-coupled amplifier as the audio amplifier 71. With the switch 43 in its open position as shown, the output of the audio amplifier across the resistor 41 or other coupling impedance, such as the secondary of an audio output transformer, provides a voltage drop which corrects for the disturbances due to noise in the television transmitter.

The operation of the correction circuit is actually to alter the amount that the entire phase inverter and pulse amplifier stage is elevated above ground. This, in turn, affects the net voltage of the charging circuit for the capacitor 11 which determines the clamping level of the modulator stage 17. By providing an audio amplifier 71 with a good low frequency response, that is to say all frequencies below, for example, 700 to 800 cycles per second, disturbances arising from insufficient filtering of the unidirectional power supplies, microphonics, alternating current operation of tube filaments, and power line voltage surges are substantially eliminated. With the switch 43 opened, a given low frequency signal "*e*" at the grid 13 of the modulator stage 17 will produce a demodulated signal of magnitude "E" across the resistor 41. The improvement in transmitted synchronizing peak noise upon opening the switch 43 will be $$20 \log_{10} \frac{E}{e} db$$

The noise modulation transmitted on the synchronizing peaks can be reduced to a very low value by this arrangement. However, a small vestige of the noise must remain to actuate the correction circuit.

The present invention has the advantage that it corrects for noise regardless of its origin. That is, noise which arises outside of the portion of the circuit included within the feed-back loop from the output transmission line 21 to the additional resistor 41 is removed to the same degree as noise occurring within this portion of the circuit.

In accordance with an actual embodiment of the noise reduction circuit of this invention, the following values for the various components were utilized:

| | | |
|---|---|---|
| Capacitor **11** | mmf | 2,200 |
| Capacitor **45** | mf | 1 |
| Capacitor **47** | mf | .01 |
| Capacitor **49** | mf | .01 |
| Capacitor **67** | mf | .01 |
| Capacitor **68** | mmf | 10 |
| Capacitor **73** | mf | 10 |
| Resistor **37** | ohms | 2,200 |
| Resistor **39** | do | 2,200 |
| Resistor **41** | do | 2,200 |
| Resistor **57** | do | 150,000 |
| Resistor **59** | do | 150,000 |
| Resistor **61** (potentiometric tapped resistor) | do | 25,000 |
| Resistor **69** | megohms | 8.2 |
| Dual diode tube **51** | | type 6H6 |
| Pulse amplifier tube **28** | | type 6AC7 |
| Peak detector diode **65** | | type 6AL5 |

I claim:

1. A noise reduction circuit for a television transmitter having a modulator stage, a radio frequency output stage electrically coupled to said modulator stage, and a direct current restoration circuit operatively connected to said modulator stage comprising: sampling means coupled to said output stage; peak detecting means coupled to said sampling means to derive a signal representative of the maximum excursions of radio frequency output; said restoration circuit including means, coupled to a source of recurring voltage pulses in said transmitter, for producing a pair of push-pull related pulses for each of said voltage pulses; an impedor so coupled to said restoration circuit that the voltage drop across said impedor elevates said push-pull pulse producing means to a potential positive with respect to a point of zero potential; and means coupling said derived signal across said impedor in inverse phase relationship to variations in said maximum excursions of radio frequency output.

2. A noise reduction circuit for a television transmitter comprising a modulator, a radio frequency output stage electrically coupled to said modulator, a keyed clamp circuit coupled to a source of recurring voltage pulses in said transmitter, said clamp circuit operating to clamp the input circuit of said modulator to a predetermined potential in response to each of said recurring pulses, circuit means coupled to said output stage to sample the transmitter output and derive a signal representative of the maximum excursions of radio frequency energy in said output, an impedor so coupled to said clamp circuit that the voltage drop across said impedor affects said predetermined potential, and means coupling said derived signal across said impedor in inverse phase relationship to variations in said maximum excursions of radio frequency output.

3. A noise reduction circuit for a television transmitter comprising a modulator, a radio frequency output stage electrically coupled to said modulator, a keyed clamp circuit coupled to a source of recurring voltage pulses in said transmitter, said clamp circuit operating to clamp the input circuit of said modulator to a predetermined potential in response to each of said recurring pulses, circuit means coupled to said output stage to sample the transmitter output and derive a signal representative of the maximum excursions of radio frequency energy in said output, an amplifier coupled to said circuit means to amplify said derived signal, an impedor so coupled to said clamp circuit that the voltage drop across said impedor affects said predetermined potential, and means coupling the output of said amplifier across said impedor in inverse phase relationship to variations in said maximum excursions of radio frequency output.

References Cited in the file of this patent

UNITED STATES PATENTS

| | | |
|---|---|---|
| 2,292,816 | Bedford | Aug. 11, 1942 |
| 2,315,388 | Bedford | Mar. 30, 1943 |
| 2,564,017 | Maggio | Aug. 14, 1951 |
| 2,693,500 | Cooper | Nov. 2, 1954 |